Aug. 26, 1941.  N. A. LAURY  2,254,014
PROCESS OF MAKING CHLORINE AND SODIUM SULPHATE
Filed Nov. 21, 1939
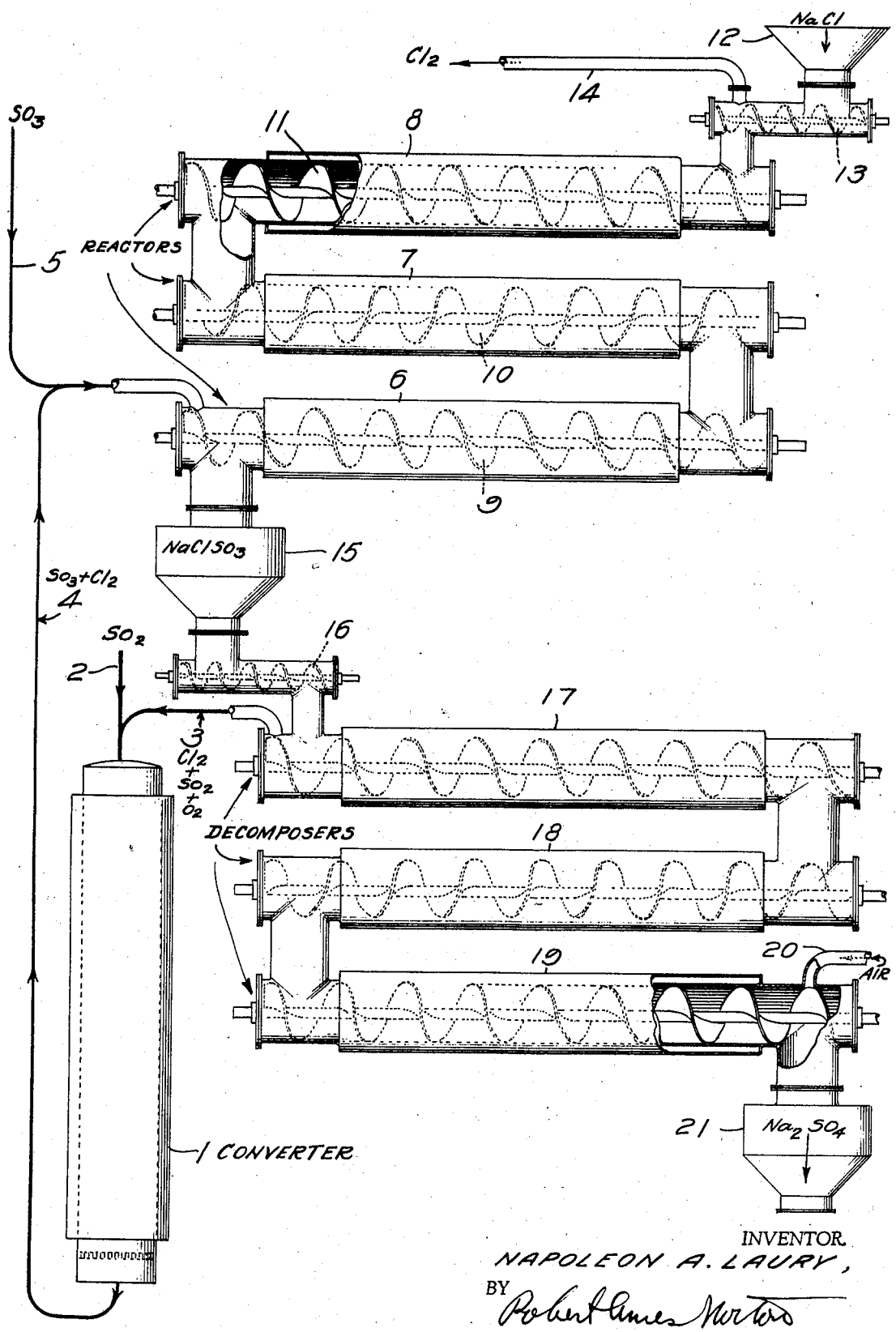
INVENTOR.
NAPOLEON A. LAURY,
BY
ATTORNEY.

Patented Aug. 26, 1941

2,254,014

UNITED STATES PATENT OFFICE 2,254,014

PROCESS OF MAKING CHLORINE AND SODIUM SULPHATE

Napoleon Arthur Laury, Rockville Centre, N. Y., assignor to American Cyanamid Company, New York, N. Y., a corporation of Maine Application November 21, 1939, Serial No. 305,471

4 Claims. (Cl. 23—121)

This invention relates to the process of producing chlorine and more particularly a process of simultaneously producing chlorine and sodium sulphate.

There are a number of fields, notably the paper making industry which consume large quantities of chlorine and require sodium sulphate in approximately the same amounts. Frequently paper mills are located at a considerable distance from heavy chemical producing areas and freight is therefore a serious item. The ordinary methods of producing chlorine economically by electrolytic processes result in the production of byproducts which are not required by the same industry consuming the chlorine. This is militated against isolated units in proximity to areas having large paper mills. Modern processes of producing chlorine which are usually electrolytic in nature also require for efficient operation relatively large units which again stands in the way of locating small chlorine producing units in proximity to isolated consuming areas.

According to the present invention chlorine and sodium sulphate are produced by the decomposition of sodium chlorosulphonate which in turn may be produced simply and easily by a reaction of $SO_3$ on NaCl. Thus, the only raw materials needed for the process of the present invention are salt and a sulphide or sulphur. Salt is widely distributed and the amount of sulphur required is relatively small so that freight is not a serious item. Moreover, sulphur or sulphides are also widely distributed so that frequently there is available a local source of sulphur or at least a source which is situated at accessible distances.

The present invention is not limited to any particular apparatus or organization of processes and includes the production of chlorine and sodium sulphate from sodium chlorosulphonate regardless of how the sodium chlorosulphate is produced. Very efficient batch processes can be designed and in some cases I prefer to utilize a continuous process of producing chlorine and sodium sulphate from salt and sources of sulphur, and in a more specific aspect this constitutes a part of the invention and presents important operating advantages.

The essential process step of the present invention involves the decomposition of sodium chlorosulphonate at elevated temperatures, preferably between 150-350° C. It is not intended to limit the present invention to a particular theory of action, but I believe that the process can be best expressed by the following equation:

$$4NaCl.SO_3 \rightarrow Na_2SO_4 + Na_2S_2O_7 + SOCl_2 + Cl_2$$

The sodium pyrosulphate produced can be neutralized if desired by sodium carbonate, for instance, in the form of soda ash. The process operates even if no oxygen is present but preferably I pass air or oxygen through the reaction mixture as this serves to decompose any $SOCl_2$ formed giving more chlorine. In addition to the chlorine, sulphur dioxide results which may be expressed by the reaction:

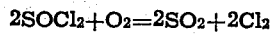
$$2SOCl_2 + O_2 = 2SO_2 + 2Cl_2$$

The passage of air or similar containing gas through the reaction mixture appears also to control the reaction and to moderate any local overheating. It is therefore desirable although not an essential feature of the present invention.

The sodium chlorosulphonate is preferably produced by the reaction of $SO_3$ on sodium chloride which takes place at moderate temperature, for example about 100° C. although the reaction will take place at lower temperatures. The $SO_3$ can be effectively produced from a suitable contact sulphuric acid converter and this set-up permits combining the decomposition step with the formation of fresh sodium chlorosulphonate in a very effective manner. Since the gaseous products of the decomposition contain chlorine and $SO_2$ they can be passed into the converter at oxidizing temperatures with additional $SO_2$ and $O_2$, giving $SO_3$ and chlorine, and chlorine and the $SO_3$ absorbed by the salt reacting therewith to produce fresh sodium chlorosulphonate, and discharging a gas containing chlorine with small amounts of oxygen, nitrogen, and the like, from which gas the chlorine can be readily separated, for example by liquefaction.

The formation of the sodium chlorosulphonate may be effected continuously or in batches. In either case, however, the over-all process is a continuous one involving the introduction of sulphur and air-containing materials at some point of the converter, and salt at another, and producing continuously chlorine and sodium sulphate or salt cake. Such a continuous process presents many advantages as it permits the continuous production of chlorine and salt cake in a relatively compact unit and for many operations the diluted chlorine which is obtained can be used directly, for example, in the paper industry it is used directly as a bleach, or transformed into sodium or calcium hypochlorite without first isolating the chlorine in concentrated form. This possibility of small compact units which can be located at paper mills or at other locations where there is a demand for chlorine and salt cake is one of the important economic advantages of the present invention.

The invention will be described in greater detail in conjunction with a specific example illustrated in the drawing which is an illustration, partly broken away, of a device permitting continuous operation.

In the drawing a sulphuric acid converter is shown at 1 taking $SO_2$ gas through a pipe 2 and exhausts waste $SO_2$ and chlorine containing gases through the pipe 3. In the converter the $SO_2$ is oxidized to $SO_3$ in the usual manner using any suitable chlorine resistant catalyst such as the common vanadium catalyst. The gases leaving the converter through pipe 4 contain $SO_3$, chlorine and nitrogen with small amounts of excess oxygen. Advantageously the concentration of $SO_3$ is maintained at as high a point as is feasible, for example about 9%. The gas is cooled down to about 115° C. and if desired additional $SO_3$ may be introduced through pipe 5 from a second contact unit. The gas is then passed through a decomposer consisting of three cylindrical reaction vessels, 6, 7, and 8, provided internally with rotating screws 9, 10, and 11 and connected to each other so that the gas travels in series through the three. Finely ground salt, for example salt ground to about 200 mesh is introduced into the hopper 12 and thence by means of the small screw 13 into the end of the reactor 11. The salt therefore is passed in counter current to the flow of the $SO_3$ and chlorine containing gas and reacts with $SO_3$ to produce sodium chlorosulphonate. Chlorine diluted with fixed gases such as nitrogen passes out of pipe 14 and sodium chlorosulphonate is discharged from the reactor 6 into the hopper 15 whence it is fed by the screw 16 into a series of decomposers, 17, 18 and 19, each provided with a screw in the same manner as the reactors, 6, 7, and 8. Air or oxygen is introduced at the opposite end of the series of decomposers 19 through pipe 20 and passes the decomposers in counter current to the sodium chlorosulphonate. The decomposers are maintained at an elevated temperature preferably in the neighborhood of 350° C., although reaction will take place at considerably lower temperatures or at higher temperatures up to about 450° C. A mixture of sodium sulphate and sodium pyrosulphate approximating that of salt cake is finally discharged into the hopper 21 while the chlorine set free together with the $SO_2$ passes out of the decomposer 17 through the pipe 3 entering the converter 1 and repeating the cycle above described.

The decomposition of sodium chlorosulphonate and the reaction of $SO_3$ with NaCl take place at different rates, the former reaction being the slower of the two. Therefore, the rate of flow of gases through the two pieces of apparatus will be different. The drawing is intended to be semi-diagrammatic in nature and not to represent actual apparatus dimensions. For simplicity of illustration the decomposers and reactors are shown as of the same length. In actual practice the dimensions will be chosen to give the desired reaction time.

Where a pure chlorine, that is to say, pure diluted chlorine which is substantially free from $SO_3$ is desired, the reaction can be carried on in the reactors until practically all of the $SO_3$ is absorbed. However, this does not produce as pure sodium chlorosulphonate and results in a product contaminated with pyrosulphates which to some extent hinder the efficiency of the decomposition reaction. It is therefore desirable in many cases to restrict the extent of the reaction of the $SO_3$ with the salt to approximately 58% of the $SO_3$ leaving slightly over 40% unabsorbed. This can be repeated in each reactor in series so that with three reactors the remaining $SO_3$ is only about 0.3% which is insufficient to hinder the use of the chlorine for many purposes. The invention is not limited to a particular degree of completeness of the reaction of the salt and $SO_3$ as each installation represents a compromise between reactor length and unreacted $SO_3$. The most economical compromise will be chosen in each case after due consideration of the economic factors involved.

The preferred modification of the present invention has been described above in the form of a continuous process. It is, however, not necessary that a continuous process be effected, for example, instead of a continuous series of reactors in a single rotary kiln with a loose cage of steel bars or other suitable agitating means, may be employed. The gas leaving the rotary kiln will contain considerable amounts of $SO_3$ which can be absorbed in a second rotary kiln. When rotary kilns are used it generally takes about five hours for the salt in the first kiln to completely react. After the reaction is complete in the first kiln, the gas can then be switched to the second and another batch prepared.

Sodium chlorosulphonate in the form of a dry powder from the first kiln is fed into a horizontal iron rotator or decomposer as described above and the second step of the process is carried out as described. The cake discharged is approximately an equimolecular mixture of $Na_2SO_4$ and $Na_2S_2O_7$ which is transformed into $Na_2SO_4$ with soda ash.

What I claim is:

1. A continuous process for producing sodium sulphate and chlorine from sodium chloride and $SO_2$ containing gases which comprises passing a stream containing $SO_2$, oxygen, and chlorine through a contact sulphuric acid converter at reaction temperature to produce gases containing $SO_3$ and chlorine, passing these gases over finely divided sodium chloride at a temperature sufficiently high to produce reaction therewith but below the temperature at which sodium chlorosulphonate is decomposed into chlorine and $SO_2$ whereby the $SO_3$ content of the gases reacts with the sodium chloride to produce sodium chlorosulphonate, discharging the chlorine admixed with the fixed gases from the reactor, removing the sodium chlorosulphonate formed from the zone of reaction, heating the sodium chlorosulphonate to the decomposition temperature in the presence of a stream of oxygen containing gas whereby gaseous chlorine, $SO_2$ and sodium sulphate are produced by the decomposition, recovering the sodium sulphate produced and passing the gaseous stream containing chlorine and $SO_2$ together with additional $SO_2$ through the contact sulphuric acid converter.

2. A process according to claim 1 in which a vanadium catalyst is used in the contact sulphuric acid converter.

3. A cyclic process of producing chlorine which comprises passing gases containing sulphur trioxide in contact with sodium chloride at temperatures below 150° C. but sufficiently high to produce sodium chlorosulphonate, removing the latter from the reaction zone and heating it to at least the decomposition temperature to produce sodium sulphate and a gaseous mixture of chlorine and sulphur dioxide, separating the sodium sulphate from said gaseous mixture and passing the latter together with oxygen through a contact sulphuric acid converter to produce a gas mixture containing sulphur trioxide and chlorine, contacting this gas with more sodium chloride in the first reaction stage to absorb the sulphur trioxide, removing the gases from the resulting chlorosulphonate, and recovering chlorine from said gases.

4. The process according to claim 3 in which a vanadium catalyst is used in the contact sulphuric acid converter.

NAPOLEON ARTHUR LAURY.